United States Patent [19]

Iwata et al.

[11] Patent Number: 5,704,873
[45] Date of Patent: Jan. 6, 1998

[54] CONTROL SYSTEM FOR CLUTCH REENGAGEMENT DURING AN IN-GEAR STOPPED STATE OF AN AUTOMATIC TRANSMISSION

[75] Inventors: Akihito Iwata, Hekinan; Yoshihisa Yamamoto, Nishio; Kazuhiro Mikami, Kariya; Masahiro Hayabuchi, Anjo, all of Japan

[73] Assignee: Aisin Aw Co., Ltd., Japan

[21] Appl. No.: 645,953

[22] Filed: May 10, 1996

[30] Foreign Application Priority Data

May 12, 1995 [JP] Japan .................. 7-115011

[51] Int. Cl.$^6$ ........................... F16H 61/20
[52] U.S. Cl. ............... 477/115; 477/116; 477/117
[58] Field of Search ............... 477/91, 93, 95, 477/114, 115, 116, 117, 166, 86

[56] References Cited

U.S. PATENT DOCUMENTS

| | | |
|---|---|---|
| 4,644,826 | 2/1987 | Kubo et al. .................. 477/95 |
| 4,709,979 | 12/1987 | Sakai et al. .................. 477/95 X |
| 4,730,708 | 3/1988 | Yukig et al. .................. 477/114 |
| 4,775,938 | 10/1988 | Hiramatsu .................. 477/114 X |
| 4,984,485 | 1/1991 | Kojima et al .................. 477/116 |
| 5,224,398 | 7/1993 | Sasaki .................. 477/116 X |
| 5,400,670 | 3/1995 | Yamatani et al. .................. 477/117 X |
| 5,586,954 | 12/1996 | Iwata et al. .................. 477/93 |

FOREIGN PATENT DOCUMENTS

| | | |
|---|---|---|
| 392732 | 10/1990 | European Pat. Off. . |
| 4241171 | 6/1994 | Germany . |
| 238532 | 10/1986 | Japan . |
| 2158912 | 11/1985 | United Kingdom . |

OTHER PUBLICATIONS

Patent Abstracts of Japan vol. 11, No. 86 (M-572) May 17, 1987.

Patent Abstracts of Japan vol. 12, No. 52 (M-668) Feb. 17, 1988.

Patent Abstracts of Japan vol. 10, No. 295 (M-523) Oct. 7, 1986.

Patent Abstracts of Japan vol. 15, No. 253 (M-1129) Jun. 27, 1991.

*Primary Examiner*—Khoi Q. TA
*Attorney, Agent, or Firm*—Lorusso & Loud

[57] ABSTRACT

A control system for an automatic transmission, has a fluid transmission unit for transmitting the rotation of an engine to a speed change unit; a clutch adapted to be applied when a forward running range is selected to transmit the rotation of the fluid transmission unit to the transmission mechanism of the speed change unit; a stopped state detector for detecting a stopped state of a vehicle wherein the stopped state is defined as a forward running range being selected, the throttle opening being fully closed, the brake pedal being depressed, and the vehicle speed being substantially zero; engine speed detector for detecting the engine speed; clutch operation force generating means for generating the application force of the clutch; and a control unit. The control unit releases the clutch by reducing the engaging force of the clutch when the stopped state of the vehicle is detected by the stopped state detecting means. The engine RPM when the clutch is released is stored as an initial engine RPM in storage means so that a neutral ending engine RPM is set on the basis of the initial engine RPM. The clutch is applied by strengthening its application force if the stopped state of the vehicle is not detected when the clutch is released and if the engine RPM exceeds the neutral ending engine RPM.

3 Claims, 8 Drawing Sheets

|  | | Clutch | | | Brake | | | | One-way Clutch | | |
|---|---|---|---|---|---|---|---|---|---|---|---|
|  | | C1 | C2 | C3 | B1 | B2 | B3 | B4 | F1 | F2 | F3 |
| R | | × | ○ | × | × | × | ○ | ○ | × | × | × |
| N | | × | × | × | × | × | × | ○ | × | × | × |
| D | 1 ST | ○ | × | × | × | × | (○) | ○ | × | ○ | ○ |
|   | 2 ND | ○ | × | × | ○ | ○ | × | ○ | ○ | × | ○ |
|   | 3 RD | ○ | × | ○ | ○ | ○ | × | × |  | × | × |
|   | 4 TH | ○ | ○ | ○ | × | ○ | × | × | × | × | × |

CONTROL SYSTEM FOR CLUTCH REENGAGEMENT DURING AN IN-GEAR STOPPED STATE OF AN AUTOMATIC TRANSMISSION

BACKGROUND OF THE INVENTION

1. Field of the Invention

The present invention relates to a control system for an automatic transmission.

2. Related Art

In the prior art, an automatic transmission is provided with a torque converter acting as a fluid transmission unit for receiving rotation generated by an engine, and a speed change unit for changing the speed of rotation transmitted from the torque converter. The speed change unit is equipped with a planetary gear unit composed of a plurality of gear elements, so that it may change the speed in accordance with a shift pattern which is set in advance in a manner corresponding to vehicle speed and throttle opening.

The automatic transmission can select gear shifts or ranges such as park (P), reverse (R), neutral (N), drive (D), third (3rd), second (2nd), low or first (1st). When the transmission is shifted from neutral (N) to drive (D) by the shift lever, for example, the vehicle tends to creep, i.e., the rotation of the engine in the idling state is transmitted through the torque converter to the speed change unit so that the vehicle moves forward slowly even if the accelerator pedal is not depressed. In order to avoid this creep when shifting from neutral (N) to a forward running range such as the drive (D), third (3rd), second (2nd) or first (1st) while the vehicle is substantially stopped, the oil pressure in the hydraulic servo of a first clutch is lowered while the transmission is in neutral (N) so that the first clutch is released. Then when the shift lever is operated to switch from neutral (N) to a forward running range, the first clutch remains released so that the transmission does not shift from neutral to the forward running range until the throttle opening exceeds a throttle opening set value.

However, the detection of the set value of throttle opening, such as by detecting the degree of depression of the accelerator pedal by the driver, is delayed from the initiation of accelerator depression to produce error. As a result, the transmission clutch is engaged after a substantial rise in the engine RPM, thus causing engagement shock.

In order to prevent this engagement shock, engine RPM is detected and the transmission is shifted from neutral when the detected engine RPM exceeds an engine RPM set value (as disclosed in Japanese Laid-Open Patent Application No. 238532/1986).

However operation of the transmission in neutral is desired in idling states having increased engine RPM such as during engine warming-up or during air conditioning operation. Therefore, the engine RPM set value for ending operation in neutral is set higher than the increased idling RPM of at least the engine warming-up operation and the air conditioning operation.

Thus, operation of the transmission is changed from neutral to a forward running range in the ordinary idling state by engagement of the transmission clutch only after the engine RPM is increased by the relatively high engine RPM set value so that the engagement shock cannot be sufficiently prevented.

SUMMARY OF THE INVENTION

An object of the present invention is to solve the aforementioned prior art problems in controlling operation of an automatic transmission and to provide a control system for an automatic transmission which prevents engagement shock by reducing the engagement of the clutch as much as possible.

Thus, according to a first aspect of the present invention, a control system for an automatic transmission has a control unit which releases an engaged clutch adapted to transmit rotation from a fluid transmission unit driven by an engine to a transmission mechanism of a speed change unit in response to a detected stopped state of the vehicle as defined by (a) a forward running range being selected, (b) a throttle opening being fully closed, (c) a brake pedal being depressed, and (d) a vehicle speed being substantially zero; stores the rotative speed of the engine as an initial engine speed when the clutch is released; sets a neutral ending engine speed based on the stored initial engine speed; and engages the clutch in response to either (a) the clutch being released in the absence of the stopped state of the vehicle being detected or (b) a detected engine speed exceeding the neutral ending engine speed irrespective of the presence or absence of the stopped state being detected.

In another aspect of the control system for an automatic transmission, the operating force of the clutch is released gradually when the stopped state of the vehicle is detected to shift the clutch gradually from an engaged state to a released state, and the neutral ending engine speed is set to the initial engine speed after the clutch is released.

In still another aspect of the control system for an automatic transmission, the neutral ending engine speed is set to a detected maximum engine speed during a set time period after release of the clutch by the release means.

DESCRIPTION OF THE PREFERRED EMBODIMENTS

Figure 1:
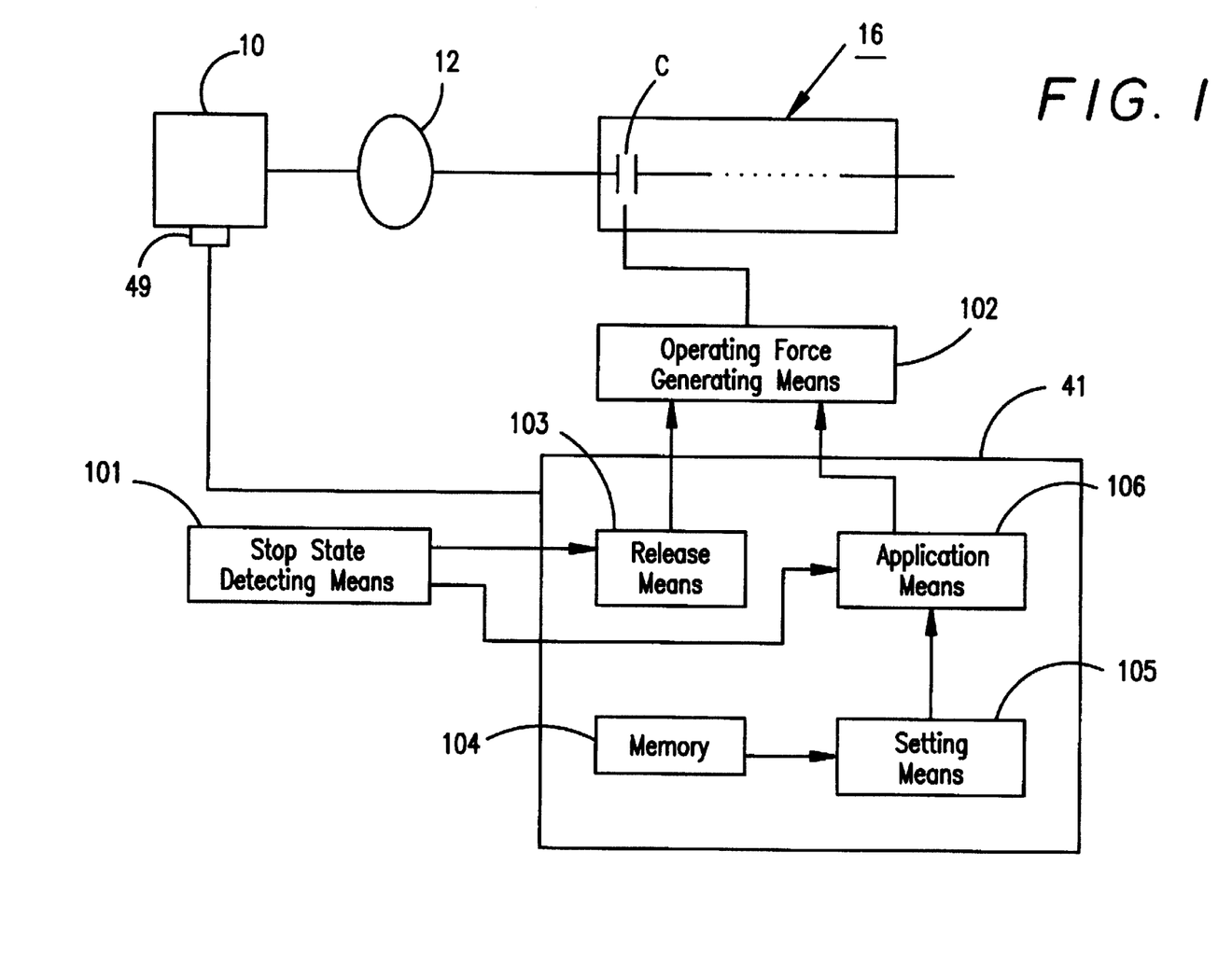
FIG. 1 is a functional block diagram of a control system for an automatic transmission in a first embodiment of the present invention.

A control system for an automatic transmission in accordance with one embodiment of the present invention is illustrated in FIG. 1, wherein reference numeral 10 designates an engine; numeral 12 designates a torque converter acting as a fluid transmission unit for transmitting the rotation of the engine 10 to a speed change unit 16; character C designates a clutch which, while engaged when a forward running range is selected, transmits rotation from the torque converter 12 to a transmission mechanism of the speed change unit 16; reference numeral 41 designates an automatic transmission control unit; numeral 49 designates an engine rotative speed or RPM sensor acting as an engine speed detector; numeral 101 designates a stopped state detector for detecting a stopped state of the vehicle in which the stopped state is defined by set vehicle conditions of a forward running range being selected, the throttle opening being fully closed, the brake pedal being depressed, and the vehicle speed being substantially zero; and numeral 102 designates clutch operating force generating facilities for generating the forces necessary for releasing and engaging (applying) the clutch C.

The automatic transmission control unit 41 includes: release means for releasing the clutch C by reducing the clutch operating force on the clutch C when the stopped state of the vehicle is detected by the stopped state detector 101; a memory 104 acting as storage means for storing the engine speed, which is detected by the engine speed sensor 49, as an initial engine speed when the clutch C is released by the release means 103; setting means 105 for setting a neutral ending engine speed based on the initial engine speed which is stored in the memory 104; and application means 106 for increasing the operating force generated by the clutch operating force generating facilities to engage the clutch C in response to either detecting the absence of the stopped state of the vehicle by the stopped state detector 101 while the clutch is released or detecting that the engine speed detected by the engine speed detector 101 exceeds the neutral ending engine speed set by the setting means 105 while the clutch is released.

Figure 2:
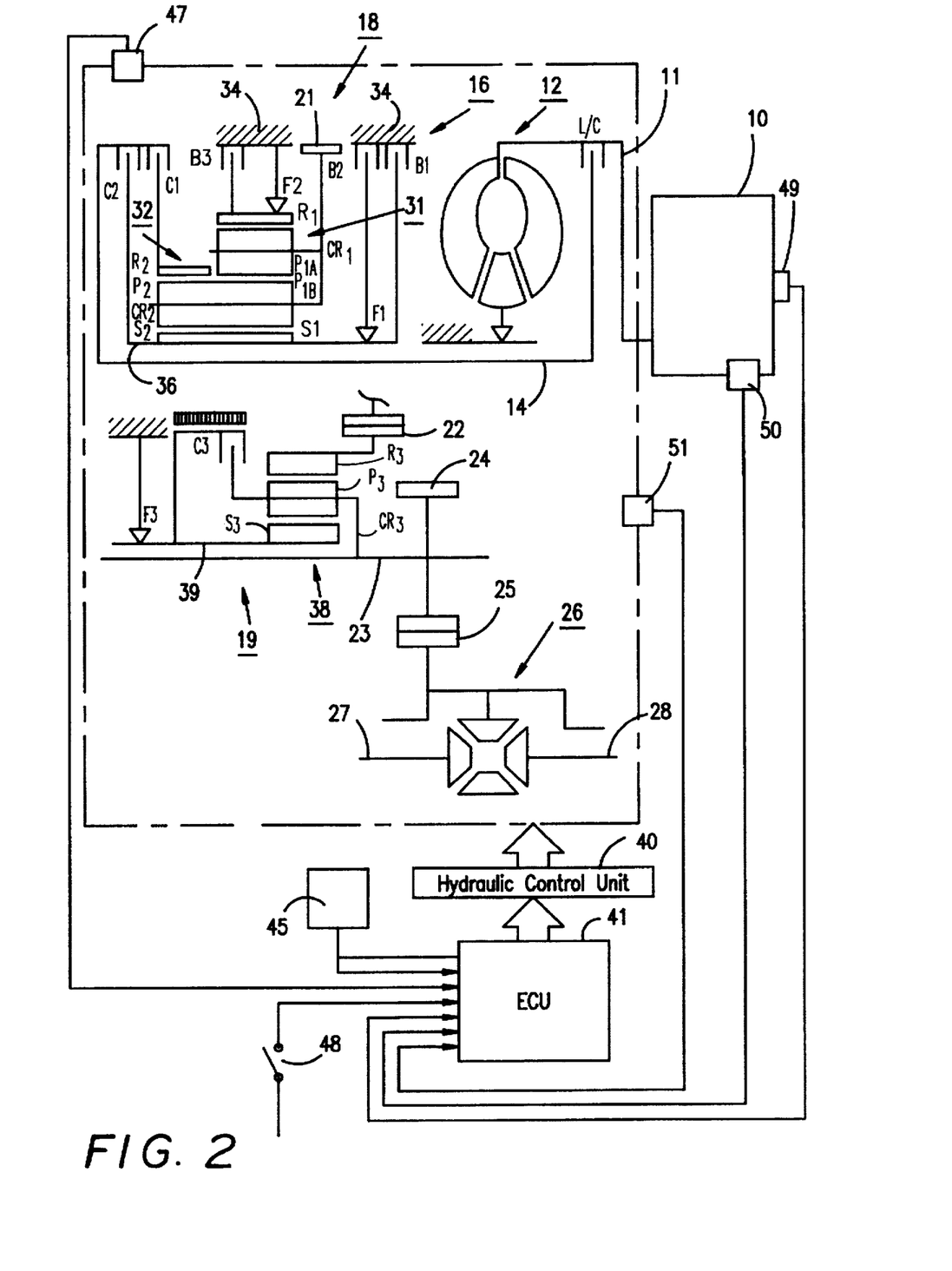
FIG. 2 is a schematic diagram of an automatic transmission for being controlled by the system of FIG. 1.

In the transmission illustrated in FIG. 2, the rotation generated by the engine 10 is transmitted through an engine output shaft 11 to the torque converter 12. This torque converter 12 transmits the rotation of the engine 10 to a converter output shaft 14 either through a fluid (or working oil) coupling or through a lockup clutch. The lockup clutch is engaged when the vehicle speed exceeds a predetermined value to avoid losses through the fluid coupling. The output shaft 14 of the torque converter drives the speed change unit 16.

This speed change unit 16, which includes four forward speed ranges and one reverse speed range, includes a main transmission 18 for three of the forward speeds and the reverse speed and an under-drive auxiliary transmission 19. The rotation of the main transmission 18 is transmitted through a counter drive gear 21 and a counter driven gear 22 to the auxiliary transmission 19, and the rotation of the output shaft 23 of the auxiliary transmission 19 is transmitted through an output gear 24 and a ring gear 25 to a differential mechanism 26.

In this differential mechanism 26, the rotation, as transmitted through the output gear 24 and the ring gear 25, is transmitted to left-hand and right-hand drive shafts 27 and 28 driving left and right drive wheels (not shown).

The main transmission 18 is equipped with a first planetary gear unit 31 and a second planetary gear unit 32 and further with a first clutch C1, a second clutch C2, a first brake B1, a second brake B2, a third brake B3 and one-way clutches F1 and F2 for transmitting the torque selectively between the individual elements of the first planetary gear unit 31 and the second planetary gear unit 32.

The first planetary gear unit 31 is composed of: a ring gear $R_1$ connected to a drive unit casing 34 through the third brake B3 and the one-way clutch F2 which are arranged in parallel with each other; a sun gear $S_1$ formed on a sun gear shaft 36 fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, as arranged in series, to the drive unit casing 34.

The second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier CR1; and a pinion $P_2$ meshing between the ring gear $R_2$ and the sun gear $S_2$, rotatably supported by the carrier $CR_2$ and formed integrally with the pinion $P_{1B}$.

The counter drive gear 21 meshes with the counter driven gear 22 in the auxiliary transmission 19, to transmit the rotation, as its speed has changed by the main transmission 18, to the auxiliary transmission 19.

This auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshing between the ring gear $R_3$ and the sun gear $S_3$ and rotatably supported by the carrier $CR_3$.

Figure 3:
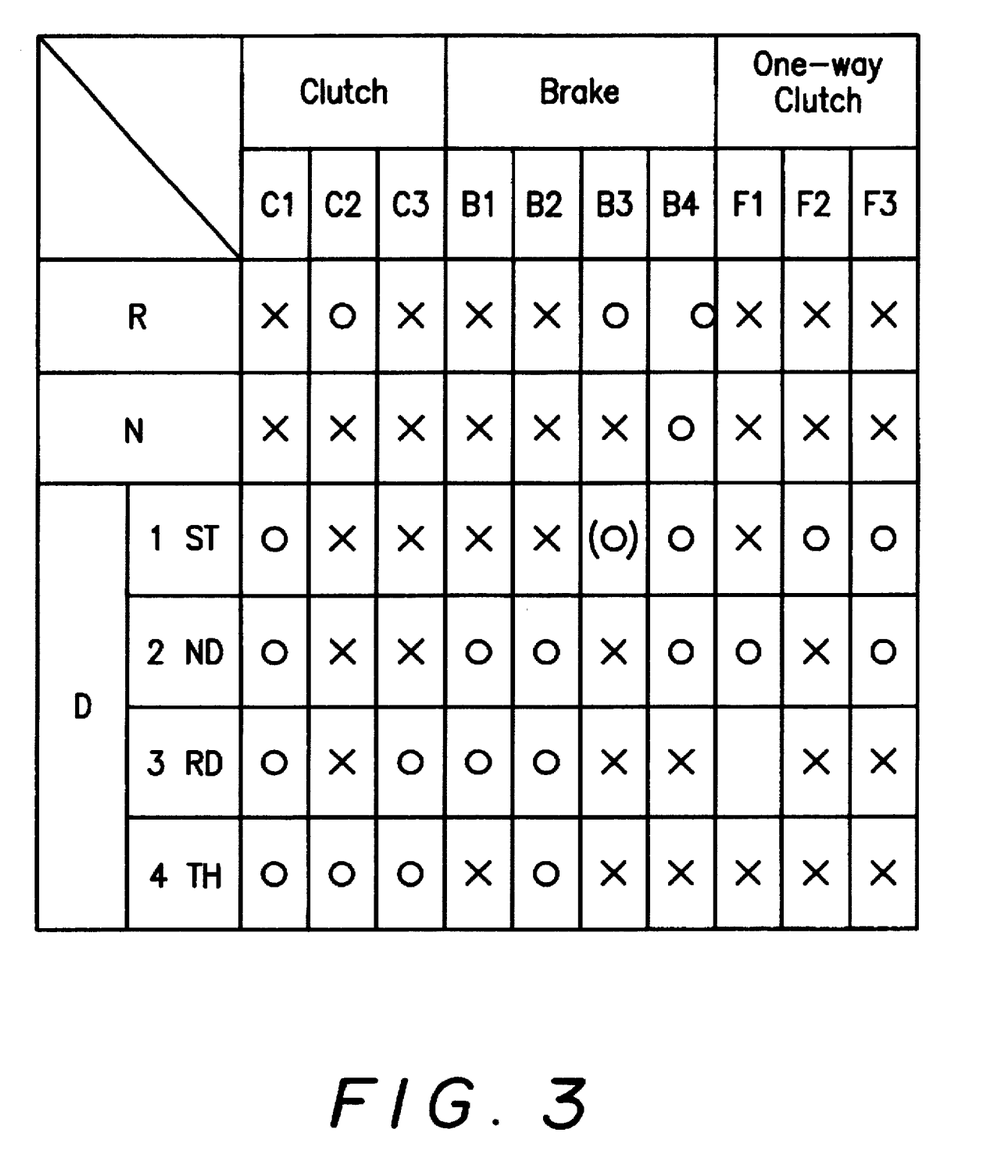
FIG. 3 is a table illustrating operation of the automatic transmission of FIG. 2.

In operation of the automatic transmission as shown in FIG. 3: characters C1 designate the first brake; characters C2 the second clutch; characters C3 the third clutch; characters B1 the first brake; characters B2 the second brake; characters B3 the third brake; characters B4 the fourth brake; and characters F1 to F3 the one-way clutches. Letter R designates a reverse running range; letter N an N-range; letter D a D-range; characters 1ST a 1st-speed gear stage; characters 2ND a 2nd-speed gear stage; characters 3RD a 3rd-speed gear stage; and characters 4TH a 4th-speed gear stage.

Symbol ○ indicates that the first clutch C1, the second clutch C2, the third clutch C3, the first brake B1, the second brake B2, the third brake B3 and the fourth brake B4 are engaged, and that the one-way clutches F1 to F3 are locked. On the other hand, symbol X indicates that the first clutch C1, the second clutch C2, the third clutch C3, the first brake B1, the second brake B2, the third brake B3 and the fourth brake B4 are released, and that the one-way clutches F1 to F3 are free.

Also the symbol (○) indicates that the third brake B3 is engaged at the engine brake time.

At the 1st speed in the D-range, the first clutch C1 and the fourth brake B4 are engaged to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while rotating the sun gear $S_2$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are engaged to lock the one-way clutches F1 and F3. Then, the rotation of the output shaft 14 is transmitted through the first clutch C1 to the ring gear $R_2$. The rotation of this ring gear $R_2$ is decelerated and transmitted to the carrier $CR_2$, because the rotation of the sun gear $S_2$ is blocked by the second brake B2 and the one-way clutch F1. The rotation of the carrier $CR_2$ is transmitted to the counter drive gear 21 while rotating the ring gear $R_1$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are engaged to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while rotating the ring gear $R_1$ idly.

The rotation, as transmitted from the counter drive gear 21 to the counter driven gear 22, is transmitted to the ring gear $R_3$. However, the relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted unchanged to the output shaft 23.

Next, at the 4th speed in the D-range, the first clutch C1, the second clutch C2, the third clutch C3 and the second brake B2 are engaged. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into direct-coupled states. As a result, the rotation of the output shaft 11 is transmitted unchanged to the counter drive gear 21.

The rotation, as transmitted from the counter drive gear 21 to the counter driven gear 22, is transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted unchanged to the output shaft 23.

The automatic transmission is provided with a hydraulic control unit 40 for establishing the individual gear stages by engaging/releasing the first clutch C1, the second clutch C2, the third clutch C3, the first brake B1, the second brake B2, the third brake B3 and the fourth brake B4.

The hydraulic control unit 40 is connected with the automatic transmission control unit (ECU) 41 so that they are operated according to the control program of the automatic transmission control unit 41.

With this automatic transmission control unit 41, on the other hand, there are individually connected a neutral start switch (N.S.S.W.) 45, an RPM sensor 47, a brake switch 48, the engine RPM sensor 49, a throttle opening sensor 50 and a vehicle speed sensor 51.

The shift position of the shift lever (not-shown), i.e., the selected range, can be detected by the neutral start switch 45. The RPM of the output shaft 14 of the torque converter 12 (as will be called the "clutch input side RPM") $N_{C1}$, as located at the input side of the first clutch C1, can be detected by the RPM sensor 47.

Furthermore, whether or not the not-shown brake pedal is depressed can be detected by-the brake switch 48. An engine RPM $N_E$ can be detected by the engine RPM sensor 49. The throttle opening $\theta$ can be detected by the throttle opening sensor 50. The RPM (as will be called the "output RPM") $N_o$ at the output side of the speed change unit 16, i.e., the vehicle speed can be detected by the vehicle speed sensor 51.

Figure 4:
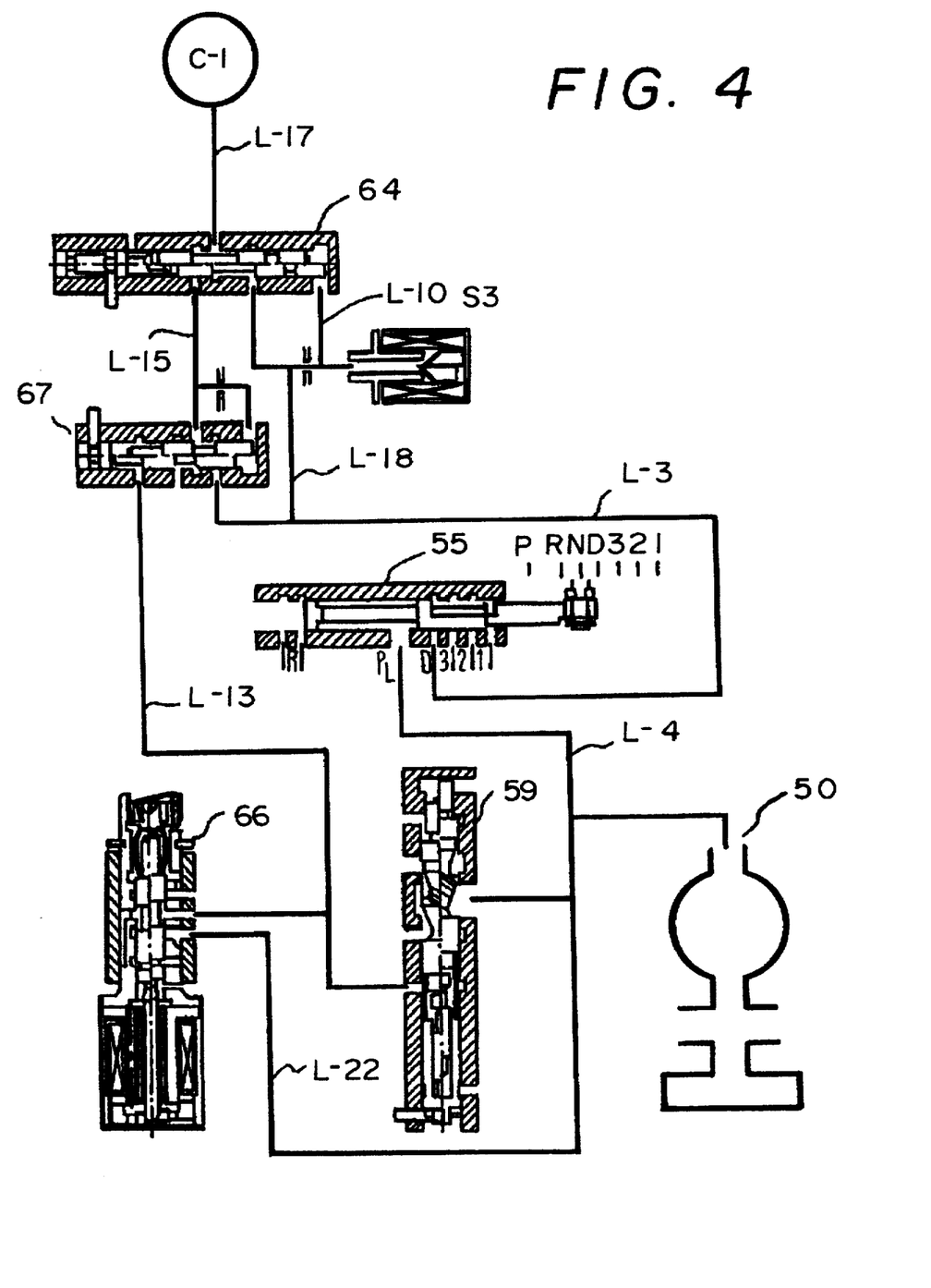
FIG. 4 is a hydraulic circuit diagram showing an essential portion of a hydraulic control unit for the automatic transmission of FIG. 2.

In an essential portion of the hydraulic control unit 40 as illustrated in the hydraulic circuit diagram of FIG. 4, a primary valve 59 regulates the oil pressure coming from the a pump 50 and outputs it as a line pressure to an oil line L-4. A manual valve 55 is provided with ports 1, 2, 3, D, $P_L$ and R so that the line pressure, as output from the primary valve 59, is fed via the oil line L-4 to the port PL. The manual valve 55 is connected to the shift lever (not shown), which is operated to output the line pressure as the 1st-range pressure, the 2nd-range pressure, 3rd-range pressure, the D-range pressure and the R-range pressure, respectively, from the ports 1, 2, 3, D and R.

When the shift lever is placed in the D-range position, the oil under the D-range pressure, as generated in the port D, is fed to the individual hydraulic servos to engage the first clutch C1 (FIG. 2), the second clutch C2, the third clutch C3, the first brake B1, the second brake B2 and the third brake B3 selectively thereby establishing one of the forward range gear stages.

In this case, when a gear stage is set to correspond to the throttle opening e so that its shift output is generated, the solenoid signals corresponding to the shift output are turned ON/OFF. When the solenoid valves are opened/closed in response to the ON/OFF of the solenoid valves, the 1–2 shift valve (not shown), 2–3 shift valve (not shown) and 3–4 shift valve (not shown) are switched.

A linear solenoid valve 66 is arranged for the neutral control. This linear solenoid valve 66 is controlled in response to the signal from the hydraulic control unit 40 so that it adjusts the oil pressure, as fed from the primary valve 59 via an oil line L-22, to generate a throttle pressure $P_{TH}$. Additionally, the linear solenoid valve 66 feeds the throttle pressure $P_{TH}$ as a control oil pressure to a C-1 control valve 67 via an oil line L-13.

The C-1 control valve 67 regulates the D-range pressure fed via an oil line L-3 so that the fed D-range pressure is changed to an oil pressure (as will be called the "C-1 oil pressure") $P_{C1}$ on oil line L-15 corresponding to the throttle pressure $P_{TH}$ from the linear solenoid valve 66.

The oil line L-15 is connected a neutral relay valve 64 which is connected to a hydraulic servo C-1 via an oil line L-17 and to a solenoid valve S3 via an oil line L-10. The neutral relay valve 64 is also connected to the oil line L-3 via an oil line L-18 so that it can feed the D-range pressure.

At a neutral control time, the solenoid valve S3 is turned ON so that the neutral relay valve 64 takes its upper half position. As a result, the C-1 oil pressure $P_{C1}$, as generated in the oil line L-15, is fed via the oil line L-17 to the hydraulic servo C1.

At the 1st to 4th speed times, on the other hand, the solenoid valve S3 is turned OFF so that the neutral relay valve 64 takes its lower half position. As a result, the oil at the-D-range pressure is fed via the oil lines L-3 and L-18 and the neutral relay valve 64 and the oil line L-17 to the hydraulic servo C-1.

The neutral relay valve 64, the linear solenoid valve 66, the C-1 control valve 67 and the hydraulic servo C-1 thus far described constitute the clutch operating force generating means 102.

Figure 5:
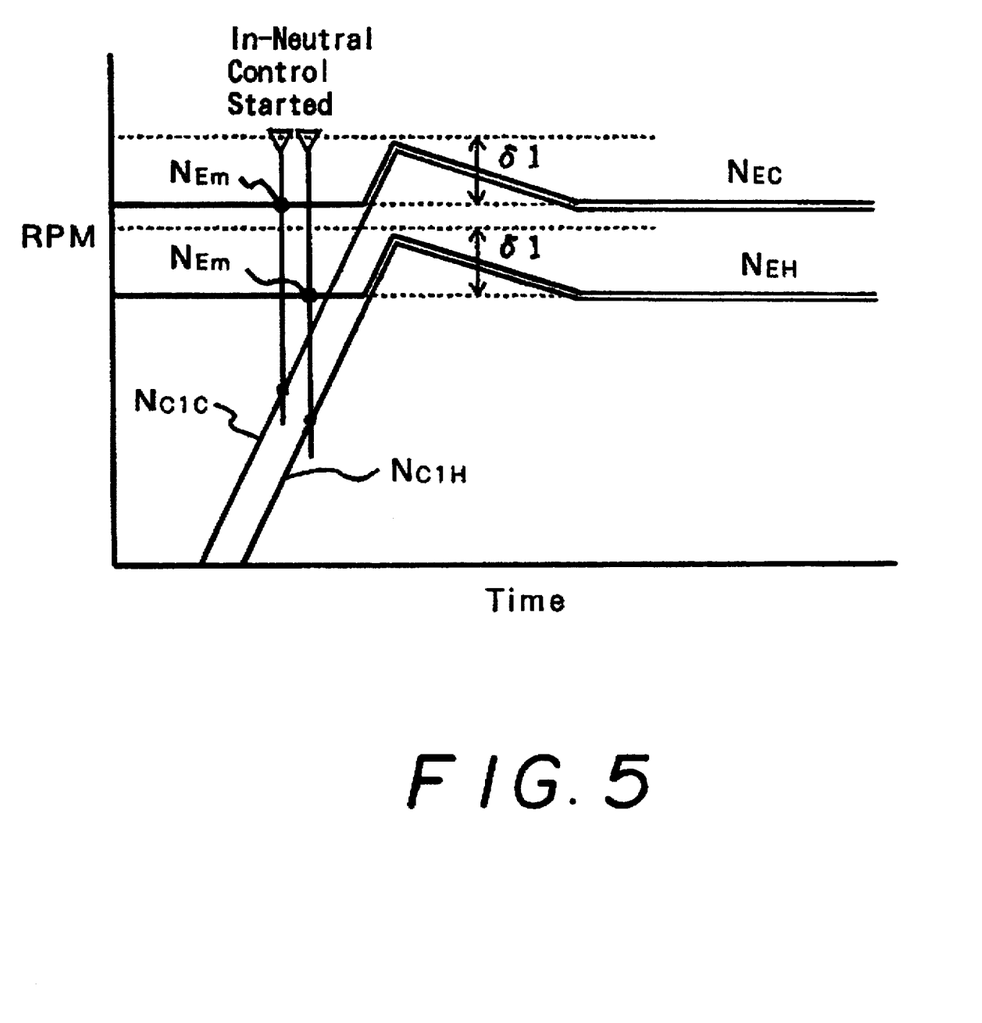
FIG. 5 is a time chart of operation of the automatic transmission control system of FIG. 1.

The operation of the automatic transmission control unit 41 is shown in the time chart of FIG. 5 for an automatic transmission control system in the first embodiment. In the drawing, the abscissa indicates the time, and the ordinate indicates the RPM.

In the present embodiment, the neutral control is composed of a first clutch release control which by a sweep-down operation lowers the throttle pressure $P_{TH}$ gradually, an in-neutral control which holds the released state of the first clutch C1 by maintaining a clutch release pressure, and a first clutch application or engagement control which by a sweep-up operation raises the throttle pressure $P_{TH}$ gradually.

When the driver depresses the accelerator pedal (not-shown) so as to start the vehicle, the engine RPM $N_E$ rises. In the present embodiment, therefore, the first clutch application control is started, but the neutral control is ended, when the engine RPM $N_E$ exceeds a set value.

The engine idling RPM $N_E$ in the neutral control fluctuates under the various conditions, for example, when an air conditioning unit is operated or during engine warm-up. In other words, the idling RPM $N_{EC}$ during air conditioner operation or during warm-up immediately after the engine (FIG. 2) is started is higher than an idling RPM $N_{EH}$ after warm-up without air conditioner operation.

Thus, either the engine RPM $N_E$ at a predetermined time during the first clutch release control or the engine RPM $N_E$ at the instant when the in-neutral control is started is set or stored as an initial engine RPM $N_{Em}$ so that the first clutch application control can be started based on the initial engine RPM $N_{Em}$.

Specifically, the first clutch application or engagement control is started if the following relationship is true for a neutral ending engine RPM $N_{En}$, which is calculated by adding a set value δ1 to the initial engine RPM $N_{Em}$:

$$N_E \geq N_{En} = N_{Em} + \delta 1.$$

The value δ1 is set to correspond to the temporary rise of the engine RPM $N_E$, as caused when the first clutch C1 is released.

Each time the engine is subjected to the neutral control, the initial RPM $N_{Em}$ is stored in the memory 104 (FIG. 1) in the automatic transmission control unit 41.

During warm-up, for example, the idling RPM $N_{EC}$ is higher than a normal idling RPM $N_{EH}$ so that the stored initial engine RPM $N_{Em}$ is accordingly greater. As a result, the set value δ1 need not include the difference between $N_{EC}$ and $N_{EH}$ and is a much smaller value since it accounts for only the temporary rise of the engine RPM $N_E$. Thus the neutral ending engine RPM $N_{En}$ can be set to a value approximate or only slightly larger than the initial engine RPM $N_{Em}$.

When an accessory such as the air conditioner requiring a higher idling RPM is operated, the initial engine RPM $N_{Em}$ is set to a correspondingly higher value. Hence, a small value δ1 is set so that the neutral ending engine RPM $N_{En}$ can be set to a value approximate or close to the initial engine RPM $N_{Em}$.

As a result, the delay in the engagement of the first clutch. C1 can be reduced. Since the first clutch C1 can be engaged before the engine RPM $N_E$ rises, it is possible not only to prevent the engagement shock but also to reduce the thermal load upon the friction members.

Excessive dragging and wear of the first clutch C1 can be prevented to improve the durability of the automatic transmission.

In FIG. 5, reference characters $N_{CIC}$ designate a clutch input side RPM during air conditioner operation staring immediately after the engine 10 is started, and characters $N_{C1H}$ designate a clutch input side RPM after the engine has been warmed-up.

In the first clutch release control the engine RPM $N_E$ is set as the initial engine RPM $N_{Em}$ at the instant when a comparison of the speed ratio e of the torque converter 12 with the set value δ1 indicates that the speed ratio e exceeds the set value δ1.

The engine RPM $N_E$ at the instant or immediately after the first clutch release control is started could be set as the initial engine RPM $N_{Em}$ when the accelerator pedal is released from its depressed state. However in the case that the engine RPM $N_E$ has not completely dropped to the normal idling RPM $N_{EH}$, a higher engine RPM $N_E$ detected in the course of dropping would be set as the initial engine RPM $N_{Em}$. As a result, the neutral ending engine RPM $N_{Em}$ would be correspondingly higher causing a delay in the engagement of the first clutch C1.

Therefore, the engine RPM $N_E$ at the latest instant after the neutral control has been started is set as the initial engine RPM $N_{Em}$.

Specifically, the engine RPM $N_E$ in the in-neutral control is substantially equal to the ordinary engine RPM $N_E$ at the instant of starting the first clutch release control when the accelerator pedal has been released, so that the engine RPM $N_E$ at the instant of starting the in-neutral control is set as the initial engine RPM $N_{Em}$.

In this case, the engine RPM $N_E$ while the first clutch C1 is shifting from the engaged state to the released state is set as the initial engine RPM $N_{Em}$ so that the intrinsic idling RPM can be accurately detected to prevent delay in the engagement of the first clutch C1. Thus the first clutch C1 can be engaged before the engine RPM $N_E$ rises, not only to prevent the engagement shock but also to lighten the thermal load upon the friction members.

Figure 6:
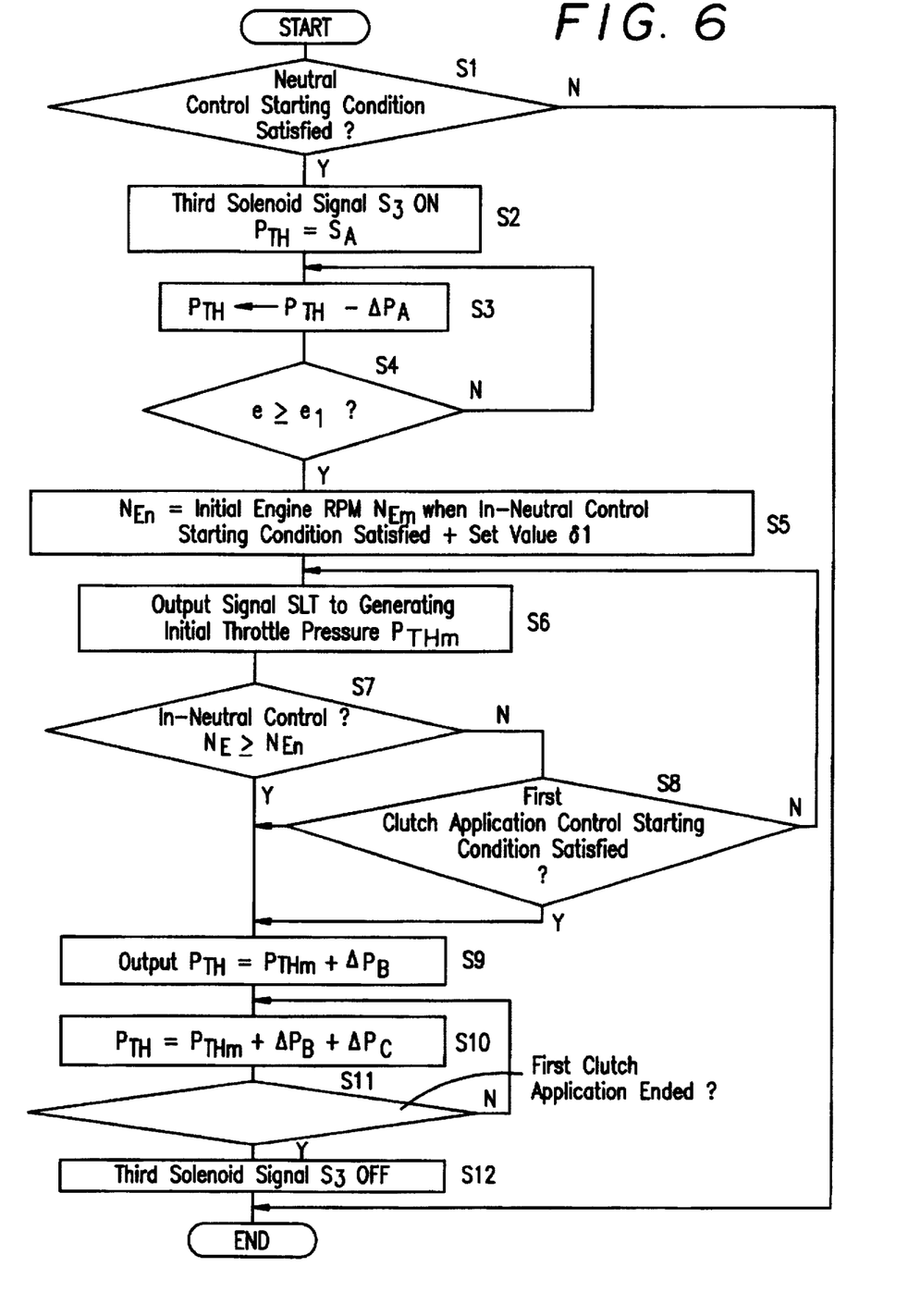
FIG. 6 is a flow chart illustrating the operation of the automatic transmission control system of FIG. 1.

FIG. 6 is a flow chart illustrating the operation of the automatic transmission control system in the first embodiment. The first clutch release control is executed at Steps S1 to S4; the in-neutral control is executed at Steps S5 to S8; and the first clutch application control is executed at Steps S9 to S12.

Step S1: The stop state detecting means 101 (FIG. 1) decides whether or not the condition for starting the neutral control is satisfied. The routine advances to Step S2, if the starting condition is satisfied, but is ended if dissatisfied.

In this case, it is decided that the starting condition is satisfied if the stopped state exists from the stopped state detector 101, FIG. 1. The stopped state exists if all of the following conditions are satisfied: that the engine 10 (FIG. 2) is in the idling state so that the throttle opening θ is in the fully closed state; that the brake pedal (not shown) is depressed so that the brake switch 48 is ON; that the D-range is selected by the shift lever; and that the vehicle speed is less than a set value which is substantially zero so that the vehicle is substantially stopped.

Step S2: A third solenoid signal S3 for turning ON/OFF the solenoid valve S3 (FIG. 4) is turned ON, and the throttle pressure $P_{TH}$ is set to a value $S_A$ with reference to a map (not shown).

Step S3: The release means 103 lowers the throttle pressure $P_{TH}$. In this case, the residue, which is calculated by subtracting a sweep-down pressure ΔPA from the throttle pressure $P_{TH}$ is set as the throttle pressure $P_{TH}$.

Step S4: The speed ratio e is calculated by the following formula from the engine RPM $N_E$ and the clutch input side RPM $N_{C1}$:

$$e = \frac{N_{C1}}{N_E}.$$

It is decided whether or not the speed ratio e is equal to or greater than a constant $e_1$. The routine advances to Step S5, if the speed ratio e is equal to or greater than the constant $e_1$, but returns to Step S3 if the speed ratio e is less than the constant $e_1$. In the present embodiment, the constant $e_1$ is 0.5.

Step S5: The setting means 105 sets the initial engine RPM $N_{Em}$ to the detected engine RPM $N_E$ at the instant when the condition for starting the in-neutral control of the first clutch C1 is satisfied and sets the value which is calculated by adding the set value $\delta 1$ to the initial engine RPM $N_{Em}$, as the neutral ending engine RPM $N_{En}$.

Step S6: The automatic transmission control unit 41 outputs a signal SLT to the linear solenoid valve 66 to generate an initial throttle pressure $P_{THm}$.

Step S7: The application means 106 decides whether or not the clutch is in the in-neutral control and whether or not the engine RPM $N_E$ is equal to or greater than the neutral ending engine RPM $N_{En}$. The routine advances to Step S9, if the clutch is in the in-neutral control and if the engine RPM $N_E$ is equal to or greater than the neutral ending engine RPM $N_{En}$, but to Step S8 if not in the in-neutral control or if the engine RPM $N_E$ is less than the neutral ending engine RPM $N_{En}$.

Step S8: The application means 106 decides whether or not the condition for starting the first clutch engagement or application control is satisfied. The first clutch engagement or application control is satisfied if the first clutch is released and there is an absence of the stopped state from the stopped state detector 101, FIG. 1, as defined in Step S1. The routine advances to Step S9, if the starting condition is satisfied, but returns to Step S6 if dissatisfied. In this case, the condition for starting the first clutch application control is satisfied if the stop state of the vehicle is not detected by the stop state detecting means 101 while the first clutch C1 is being released.

Step S9: The application means 106 outputs the value, which is calculated by adding a pressure $\Delta P_B$ to the initial throttle pressure $P_{THm}$, as the throttle pressure $P_{TH}$. If the C-1 oil pressure $P_{C1}$ is abruptly raised when the first clutch C1 shifts from the released state to the completely engaged state, the engine RPM $N_E$ decreases with the engagement of the first clutch C1, or a serious engagement shock occurs. If the C-1 oil pressure $P_{C1}$ is gradually raised, on the other hand, the time period for the first clutch C1 to end its engagement is elongated to cause the engine racing.

Therefore, an oil pressure lower than the oil pressure at the end of engagement of the first clutch C1 is fed for a predetermined time period to the hydraulic servo C-1 to establish a partially engaging state.

Step S10: The application means 106 raises the throttle pressure $P_{TH}$. Specifically, the value, which is calculated by adding the pressure $\Delta P_B$ and a sweep-up pressure $\Delta P_c$ to the initial throttle pressure $P_{THm}$, is output as the throttle pressure $P_{TH}$.

Step S11: It is decided whether or not the engagement of the first clutch C1 has been ended. The routine advances to Step S12, if the engagement of the first clutch C1 is ended, but returns to Step S10 if the engagement is not ended.

Step S12: The third solenoid signal S3 is turned OFF.

One advantage of the neutral control is that fuel economy is improved. In this neutral control, the first clutch C1 is brought into the released state so that the load upon the engine 10 is accordingly reduced. Because of the reduced engine load, the engine control reduces the fuel injection rate to the engine 10.

Because the neutral control sets the neutral ending engine speed based upon the detected engine RPM $N_E$, the RPM control is executed to achieve the set idling RPM even if the aforementioned fuel injection rate is reduced.

The RPM control is executed, after the fuel injection rate is actually lowered so that the engine RPM $N_E$ changes. Also the load upon the engine 10 may fluctuates causing the idling RPM to temporarily fluctuate. This fluctuation occurs even in the neutral control. With the first clutch C1 being substantially released and the load upon the engine 10 being reduced, the engine RPM $N_E$ during fluctuation temporarily rises before a predetermined idling RPM is achieved.

When the aforementioned neutral ending engine RPM $N_E$ is to be set, the temporary rise in the engine RPM $N_E$ may be erroneously detected, unless considered, as the depression of the accelerator pedal. However, the temporary rise in the engine RPM $N_E$ is not fixed but fluctuates more or less. Hence, the neutral ending engine RPM $N_{En}$ has to be set by considering that fluctuation, and the set value $\delta 1$ has to be accordingly increased.

Figure 7:
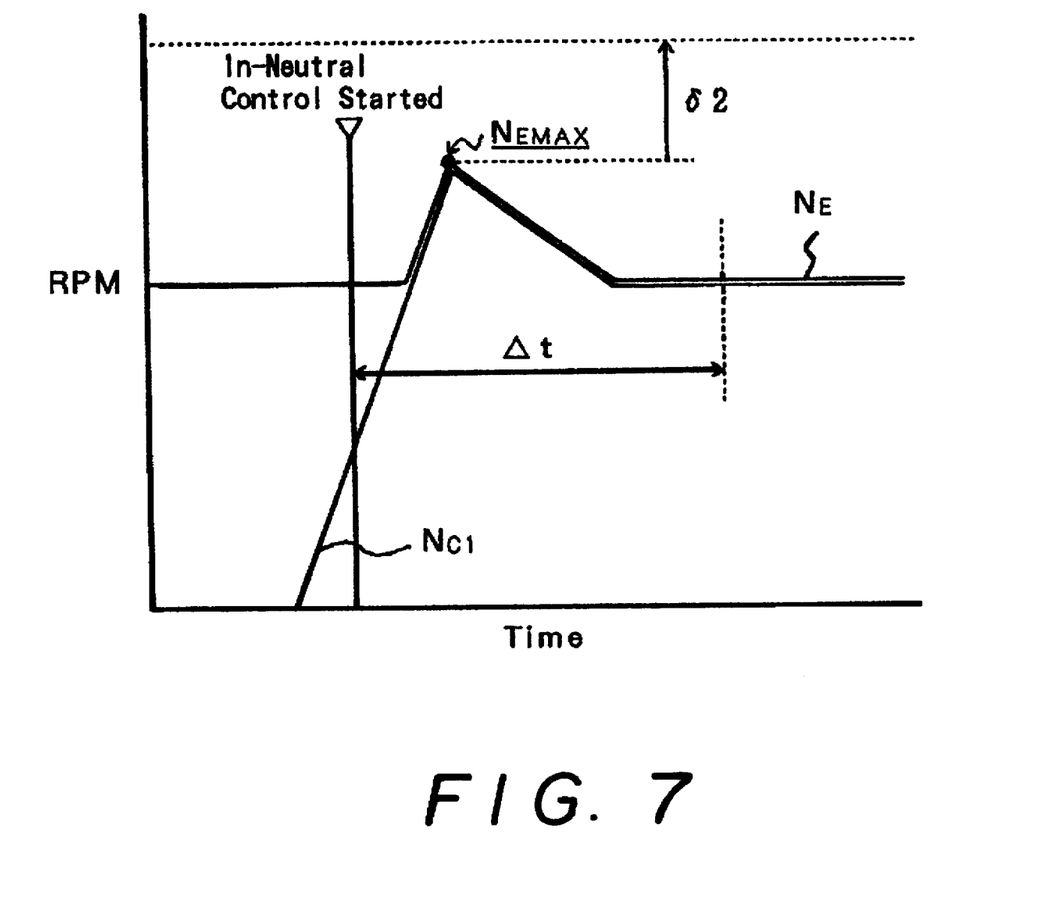
FIG. 7 is a time chart of operation of an automatic transmission control system in a second embodiment of the present invention.
Figure 8:
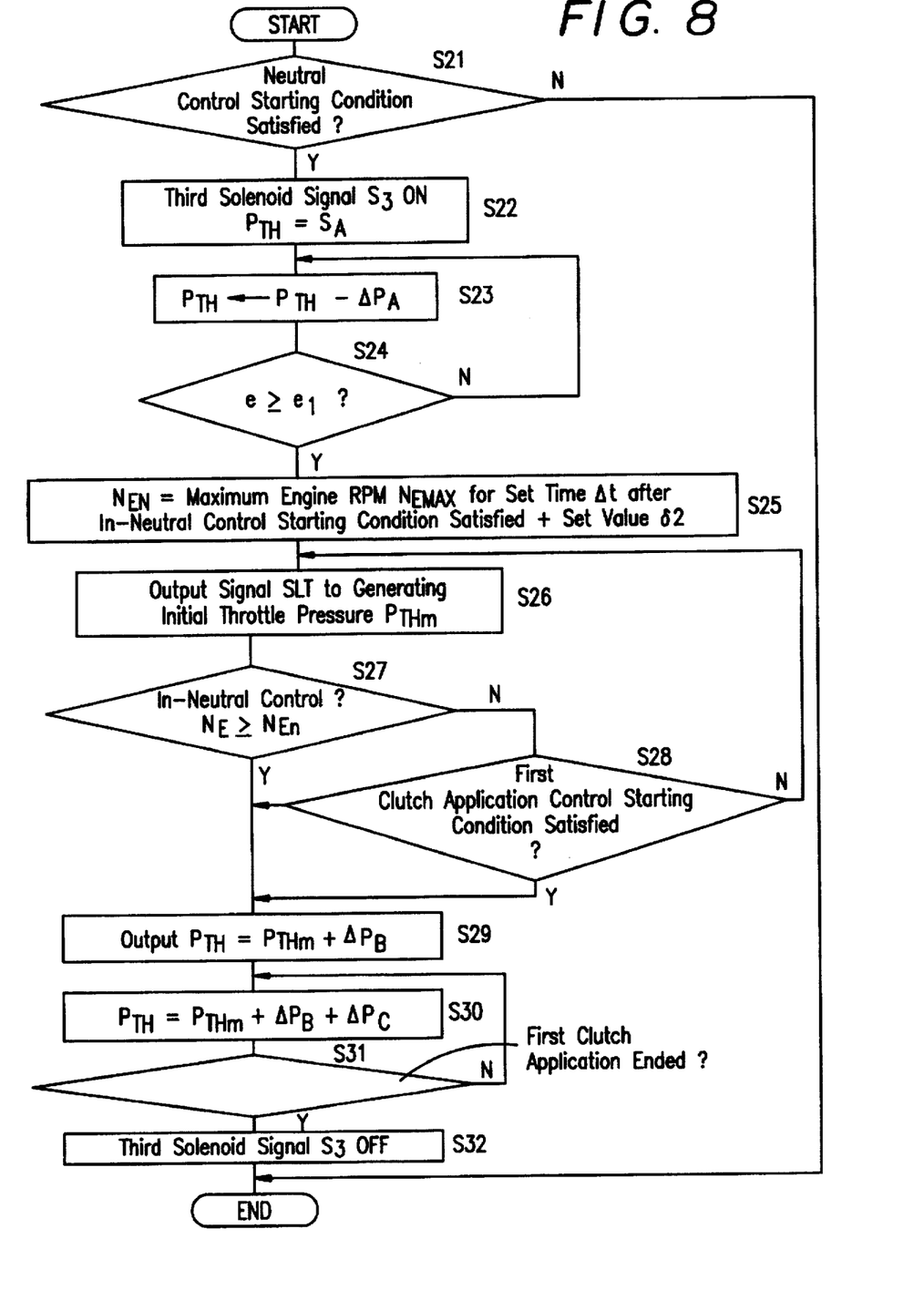
FIG. 8 is a flow chart illustrating operation of the automatic transmission control system in the second embodiment of the present invention.

However, a second embodiment illustrated in FIGS. 7 and 8 enable further reduction of the set value $\delta 1$.

In the time chart of FIG. 7 for an automatic transmission control system, the abscissa in the drawing indicates the time, and the ordinate indicates the RPM. Reference character $N_{C1}$ designates the clutch input side RPM.

In this case, the first clutch engagement or application control is started if the following relationship is true:

$$N_E \geq N_{En} = N_{EMAX} + \delta 2$$

wherein $N_{EMAX}$ is the maximum engine speed detected as the maximum of the engine RPM $N_E$ during a set time period $\Delta t$ after the start the in-neutral control. The neutral ending engine RPM $N_{En}$ is the sum of the maximum engine speed $N_{EMAX}$ and a set value $\delta 2$. The set value $\delta 2$ is set to a relatively small value to account for detector error or the like of the engine RPM sensor 49.

The maximum engine RPM or Speed $N_{EMAX}$ is stored during each neutral control in the memory 104 (FIG. 1) in the automatic transmission control system 41 (FIG. 2).

During warm-up, for example, the warm-up idling RPM $N_{EC}$ is higher than normal idling RPM, but the maximum engine RPM $N_{EMAX}$ is also set higher corresponding to the difference between the warm-up idling RPM and the normal idling RPM. As a result, the set value $\delta 2$ can be set to a relatively small value accounting only for detection error or the like of the engine RPM sensor 49.

Similarly when the engine idling RPM is set higher during operation of an accessory such as the air conditioner, the detected maximum engine speed $N_{EMAX}$ will be correspondingly higher so that the set value $\delta 2$ can be reduced.

As a result, the first clutch C1 is engaged before the engine RPM $N_E$ increases substantially. This makes it possible not only to prevent engagement or application shock but also to reduce the thermal load upon the friction members. Further, excessive dragging of the first clutch C1 is prevented to thereby improve the durability of the automatic transmission.

In this second embodiment, the engine RPM $N_E$ increases temporarily at the start of the released state of the first clutch C1 and, at its maximum, is detected as the maximum engine RPM $N_{EMAX}$. Thus, the fluctuation of the temporary rise in the engine RPM $N_E$ need not be considered so that the set value δ2 can be further reduced. This makes it possible to further reduce delay in the engagement of the first clutch C1. Thus since the first clutch C1 can be engaged before any substantial rise in the engine RPM $N_E$, it is possible to prevent engagement shock along with reducing the thermal load upon the friction members.

FIG. 8 is a flow chart illustrating the operation of the automatic transmission control system in the second embodiment of the present invention. The first clutch release control is executed at Steps S21 to S24; the in-neutral control is executed at Steps S25 to S28; and the first clutch application control is executed at Steps S29 to S32.

Step S21: It is decided whether or not the neutral control starting condition is satisfied in a manner similar to Step S1 of the first embodiment. The routine advances to Step S22, if the starting condition is satisfied, but is ended if dissatisfied.

Step S22: The third solenoid signal S3 for turning ON/OFF the solenoid valve S3 (FIG. 4) is turned ON, and the throttle pressure $P_{TH}$ is set to the value $S_A$ with reference to the map (not shown).

Step S23: The throttle pressure $P_{TH}$ is lowered. In this case, the value, which is calculated by subtracting the sweep-down pressure ΔPA from the throttle pressure $P_{TH}$ is set as the throttle pressure $P_{TH}$.

Step S24: It is decided whether or not the speed ratio e is equal to or greater than the constant $e_1$. The routine advances to Step S25 if the speed ratio e is equal to or greater than a constant $e_1$, but returns to Step S23 if the speed ratio e is less than the constant $e_1$. In the present embodiment, the constant $e_1$ is 0.5.

Step S25: After the in-neutral control starting condition of the first clutch C1 has been satisfied, the maximum engine RPM $N_E$ detected during a set time period Δt starting at beginning of the in-neutral control is set as the maximum engine RPM $N_{EMAX}$. The sum calculated by adding the set value δ2 to the maximum engine RPM $N_{EMAX}$ is set as the neutral ending engine RPM $N_E$.

Step S26: The signal SLT is output to the linear solenoid valve 66 (FIG. 4) to generate the initial throttle pressure $P_{THm}$.

Step S27: It is decided whether or not the control is in the in-neutral control and whether or not the engine RPM $N_E$ is equal to or greater than the neutral ending engine RPM $N_{En}$. The routine advances to Step S29, if in the in-neutral control and if the engine RPM $N_E$ is equal to or greater than the neutral ending engine RPM $N_{En}$, but to Step S28 if not in the in-neutral control or if the engine RPM $N_E$ is less than the neutral ending engine RPM $N_{En}$.

Step S28: It is decided whether or not the first clutch application control starting condition is satisfied in a manner similar to Step S8 of the first embodiment. The routine advances to Step S29, if the starting condition is satisfied, but returns to Step S26 if dissatisfied.

Step S29: The value, which is calculated by adding the pressure $ΔP_B$ to the initial throttle pressure $P_{THm}$, is output as the throttle pressure $P_{TH}$.

Step S30: The value, which is calculated by adding the pressure $ΔP_B$ and the sweep-up pressure $ΔP_C$ to the initial throttle pressure $P_{THm}$, is output as the throttle pressure $P_{TH}$.

Step S31: It is decided whether or not the engagement of the first clutch C1 has been ended. The routine advances to Step S32, if the engagement of the first clutch C1 has been ended, but returns to Step S30 if not ended.

Step S32: The third solenoid signal S3 is turned OFF.

Neutral control is started only if the stop state detecting means finds (a) that the forward running range is selected, (b) that the throttle opening is fully closed, (c) that the brake pedal is depressed and (d) that the vehicle speed is substantially zero.

The release means reduces the application or engagement force applied to the clutch to release the clutch.

The application means increases the application or engagement force applied to the clutch to bring about clutch engagement, if the stop state of the vehicle is not detected by the stop state detecting means while the clutch is released.

Additionally, the application means increases the application force to the clutch to engage the clutch independently of the signal from the stop state detecting means if the engine RPM detected by the engine RPM detecting means exceeds the neutral ending engine RPM as set by the setting means.

In the case of engine warm-up, for example, the idling RPM of the engine is increased so that the initial engine RPM is set correspondingly higher. Similarly when an accessory such as the air conditioner is operated thereby increasing idle speed of the engine, the initial engine RPM is set accordingly higher.

As a result, the neutral ending engine RPM can be set to a value approximate or only slightly higher than the initial engine RPM so that the delay in the clutch application is reduced. Thus the clutch is applied before the engine RPM increases substantially to prevent application shock and to also reduce the thermal load upon the friction members.

In another variation of the control system for an automatic transmission, the release means reduces the application force to the clutch gradually, if the stopped state of the vehicle is detected by the stopped state detecting means, to shift the clutch gradually from an applied state to a released state, and wherein the storage means stores the engine RPM, while the clutch is being shifted from the applied state to the released state, as the initial engine RPM.

In this case, the engine RPM at the time as late as possible after the start of the neutral control is set as the initial engine RPM. As a result, a relatively high engine RPM being lowered is not set as the initial engine RPM, so long as the accelerator pedal is released from its depressed state but the engine RPM is not completely lowered to the idling RPM. As a result, the intrinsic idling RPM can be accurately detected to prevent delay in the engagement of the clutch. Before the engine RPM rises upon depression of the accelerator pedal, the clutch is applied to prevent application shock and to also lighten the thermal load upon the friction members.

In still another control system for an automatic transmission of the present invention, the maximum engine RPM is set as the initial engine RPM as detected during a set time period after the release of the clutch by the release means.

In this case, the engine RPM, as temporarily increased when the clutch is released, is directly detected as the maximum engine RPM so that the fluctuations in the temporary increases in the engine RPM do not need to be taken into consideration.

As a result, the neutral ending engine RPM can be set to a value more approximate the initial engine RPM so that delay in the clutch application can be further reduced. Thus the clutch can be applied before the engine RPM rises substantially, not only to prevent the application shock but also to reduce the thermal load upon the friction members.

The present invention is not limited to the foregoing described embodiments but encompasses various modifications, variations and changes in detail of the described embodiments without departing from the scope and spirit of the invention.

What is claimed is:

1. A control system for an automatic transmission having a speed change unit with a transmission mechanism, a fluid transmission unit for transmitting rotation of an engine to the speed change unit; a clutch adapted to be engaged when a forward running range is selected to transmit rotation of said fluid transmission unit to the transmission mechanism of said speed change unit; stopped state detecting means for detecting a stopped state of a vehicle wherein the stopped state is defined by (a) a forward running range being selected, (b) a throttle opening being fully closed, (c) a brake pedal being depressed, and (d) a vehicle speed being substantially zero; engine speed detecting means for detecting the rotative speed of the engine; clutch force generating means for generating an operating force applied to said clutch; and a control unit operating the clutch force generating means, wherein said control unit comprises:

release means for decreasing the operating force generated by the clutch force generating means to release said clutch in response to the stopped state of the vehicle being detected by said stopped state detecting means;

storage means for storing the rotative speed of the engine detected by said engine speed detecting means as an initial engine speed when said clutch is released by said release means:

setting means for setting a neutral ending engine speed on the basis of the initial engine speed stored in said storage means; and application means for increasing the operating force generated by the clutch force generating means to engage said clutch in response to either (a) said clutch being released in the absence of the stopped state of the vehicle being detected by said stopped state detecting means or (b) said engine speed detected by said engine speed detecting means exceeding said neutral ending engine speed irrespective of the presence or absence of the stopped state being detected by said stopped state detecting means.

2. A control system for an automatic transmission according to claim 1, wherein said release means reduces the clutch operating force gradually when the stopped state of the vehicle is detected by said stopped state detecting means to shift said clutch gradually from an engaged state to a released state, and wherein said setting means sets the neutral ending engine speed to the detected engine speed after said clutch is shifted from the engaged state to the released state.

3. A control system for an automatic transmission according to claim 1, wherein said setting means sets the neutral ending engine speed to a detected maximum engine speed during a set time period after release of said clutch by said release means.

* * * * *

UNITED STATES PATENT AND TRADEMARK OFFICE
CERTIFICATE OF CORRECTION

PATENT NO. : 5,704,873
DATED : January 6, 1998
INVENTOR(S) : IWATA et al

It is certified that error appears in the above-indentified patent and that said Letters Patent is hereby corrected as shown below:

Col. 4, line 34, delete "brake" insert --clutch--.

Col. 6, line 16, "PL" should read --$P_L$--; and
line 30, "e" should read --$\theta$--.

Col. 8, line 2, "staring" should read --starting--.

Col. 11, line 34, "$N_E$detected" should read --$N_E$ detected--.

Signed and Sealed this

Third Day of November, 1998

Attest:

BRUCE LEHMAN

*Attesting Officer*   *Commissioner of Patents and Trademarks*